Feb. 3, 1942.  E. M. EVLETH  2,271,917
CYLINDER VALVE
Filed June 26, 1939
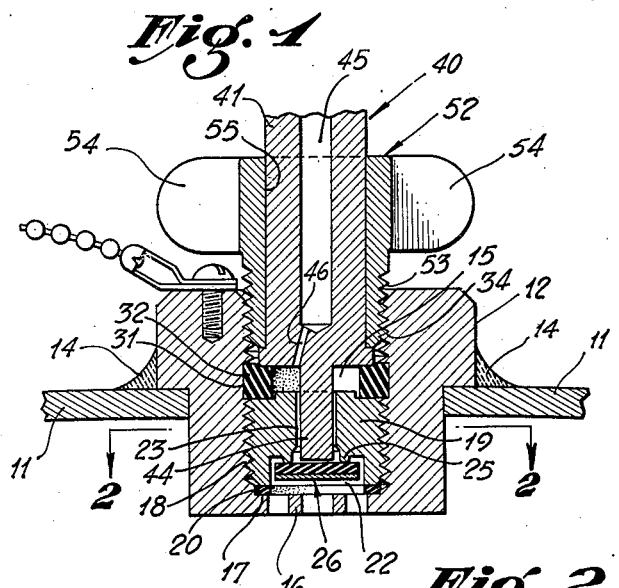
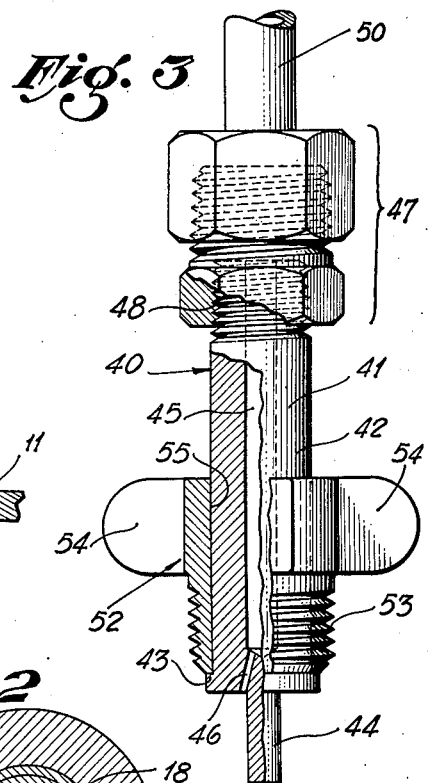
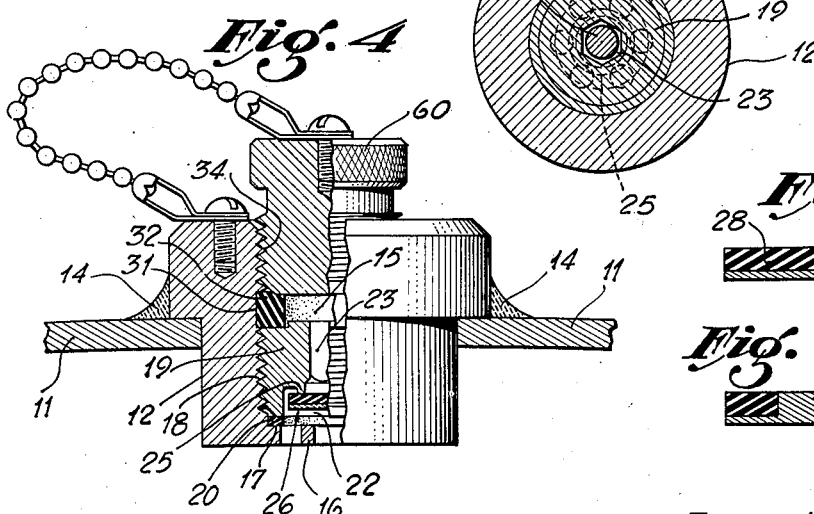
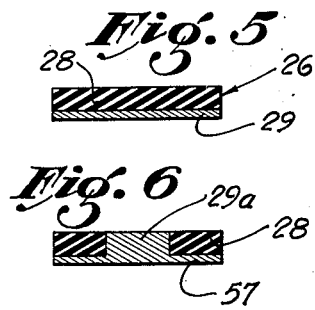
EARL M. EVLETH,
INVENTOR.
BY
ATTORNEY.

Patented Feb. 3, 1942

2,271,917

UNITED STATES PATENT OFFICE 2,271,917

CYLINDER VALVE

Earl M. Evleth, Ingelwood, Calif., assignor to L. C. Roney, Inc., Los Angeles, Calif., a corporation of California Application June 26, 1939, Serial No. 281,169

6 Claims. (Cl. 284—14)

My invention relates to valves and particularly a valve especially adapted for use on a high pressure gas cylinder.

It is common practice to supply fuel gas or combustible gas, such as butane, ethane, methane, and the like, to users in high pressure gas cylinders; and such cylinders have cylinder valves for controlling the flow of gas therefrom. The ordinary cylinder valve is secured to the cylinder and projects therefrom. Because of the rough handling of the cylinder during shipping a removable protecting cover is provided which encloses the valve during shipment and which is removed when the cylinder is installed ready for use. Furthermore, the ordinary cylinder valve includes a valve body, a valve stem having a valve member secured to the end thereof, and a packing gland around the valve stem as well as threaded connections whereby the valve may be connected to the cylinder and also connected to the conduit through which the gas is flowed. Such valves involve a considerable investment not only in first cost, but also in maintenance costs.

It is an object of my invention to provide a high pressure cylinder valve which is economical both in first cost and maintenance cost, in which all internal parts are removable and replaceable without removing the valve body from the container or part to which it is attached.

It is an object of my invention to provide a valve in which the valve body with the valve or closure member in it is secured to the cylinder and in which the other parts are removed during shipping. In this way there are no projecting parts which are liable to injury.

It is another object of my invention to provide a valve in which one portion is connected to the cylinder or to the source of supply and the other portion is in the form of a conduit means which is connected to the conduit system at the place of use, and which has a valve opener, and which is so constructed that when the conduit means is connected to the body at the place of use the valve is opened and gas is supplied to the conduit system.

In the valve of my invention the valve opening means which I have referred to as a part of the conduit means may be a permanent part of the apparatus of the user, and the body with the valve in it may be a permanent part of the cylinder. The two parts are so designed that when the part of the apparatus of the user is connected to the body the valve is automatically opened.

For use in the valve of my invention I have provided a new and improved form of valve which consists of a disc comprising a layer of valve material, such, for example, as rubber composition or synthetic rubber, which is vulcanized to a thin metal backing plate, and it is an object of my invention to provide a new article of manufacture of this character.

I have found that such valves may be economically produced by taking a thin sheet of metal and applying a thin layer of the valve material to this sheet of metal, subjecting the same to a vulcanizing process, and thereafter punching the discs from this combination of parts. It is accordingly an object of my invention to provide a method of producing the new article of manufacture of my invention.

In the accompanying drawing I have illustrated a preferred form of my invention. Various modifications or alterations may be made in the structure without departing from the spirit and scope of my invention, and I therefore wish my invention to be broadly construed in accordance with the preceding statement of invention and appended claims.

Referring to the drawing:

Fig. 1 is a sectional view through a valve incorporating the features of my invention, this view showing the sealing means being brought into operation just prior to the unseating of the valve.

Fig. 2 is a cross-sectional view taken on the line 2—2 of Fig. 1.

Fig. 3 is a quarter sectional view showing the removable part of the valve of my invention, which part may be connected to the conduit system and connected to the body of the valve when the cylinder is installed ready for use.

Fig. 4 is a quarter section illustrating the manner in which a plug may be employed in the valve body to protect the interior parts during shipping.

Fig. 5 is an enlarged section of the valve of my invention.

Fig. 6 is an enlarged section of an alternative form of valve of my invention.

As shown in the drawing, the numeral 11 is representative of a container or other source of supply of fluid or gas. Adapted to be secured to the container is the permanent part of the valve of my invention, this permanent part including a body 12 which is connected to the container 11 either by welding 14, as illustrated, or, if desired, it may be threadedly connected thereto. The valve body 12 is provided with a central outlet passage 15 which extends from the interior to the exterior thereof. At the inner end of the outlet passage is a perforate wall 16 which provides an annular shoulder 17. Above the shoulder 17 is a threaded portion 18 which receives a valve seat member 19. This valve seat member 19 seats against a gasket 20 which engages the shoulder 17 and thus forms a fluid-tight or gas-tight seal around the valve seat member 19. It will be understood that the valve seat member 19 may be considered a part of the body 12 and is made separable to permit assembly of the parts. The lower end of the valve seat member 19 is provided with a counterbore in order to form a valve chamber 22 in the lower end of the outlet passage 15. The member 19 is provided with a central passage 23 which forms a part of the outlet passage 15, this passage 23 being preferably hexagonal in cross-section in order that a wrench may be applied for installing or removing this member 19. Surrounding the lower end of the passage 23 is an annular valve seat 25. Placed in the valve chamber 22 is a valve 26 adapted to engage the valve seat 25 for closing the outlet passage 15. As shown best in Fig. 5, this valve is made from a layer 28 of valve material, such as rubber compound or synthetic rubber, and a thin metal backing plate 29. These two parts 28 and 29 are vulcanized together to form an integral structure. In practice the valve material 28 may be one-sixteenth of an inch thick, while the metal backing plate may be ten-thousandths of an inch thick.

The valve 26 is manufactured by taking a sheet of metal of suitable thickness and a sheet of valve material of suitable thickness and vulcanizing the two together. This provides a large laminated sheet. By a punching process the cylindrical discs are punched from the sheet and in this way the valves, such as 26, are produced.

It will be noted that the valve 26 is slightly smaller in diameter than the valve chamber 22 so that the cylindrical wall of the valve chamber 22 acts as a centralizing means. Also, it will be noted that the valve 26 is held against the valve seat 25 by the pressure of the gas in the cylinder or container 11. However, if desired, a compression spring could be provided between the valve 26 and the perforate wall 16.

Above the threaded portion 18 the outlet passage 15 includes an annular recess 31 which receives an annular gasket 32 which is of rectangular cross-section, as shown. The upper or outer end of the outlet passage 15 is in the form of an upper threaded portion 34.

My invention also includes a removable part 40 which is illustrated in Fig. 3. This removable part 40 includes a non-rotatable stem, conduit means, or valve opening means 41 having a cylindrical part 42 provided with a shoulder 43 at its inner end and also providing an inwardly or downwardly projecting valve engaging portion or pin 44. The stem 41 has a conduit passage 45 which is connected to the lower end by means of a connecting port 46. The upper end of the stem 41 is connected by a connecting means 47 removably secured thereto by a threaded engagement 48 to a flexible conduit or pigtail 50 which forms a part of the conduit system.

Surrounding the cylindrical portion 42 is a securing means or nut 52 having a lower threaded end 53 and having wings 54 extending outwardly from its upper end whereby the nut may be rotated. This nut 52 has an opening 55 through which the cylindrical portion 42 of the stem 41 extends and is adapted at its lower end to engage the shoulder 43 of the stem 41.

During shipping a suitable plug 60, such as illustrated in Fig. 4, is screwed into the upper threaded portion 34 to protect the valve 26 from being unseated and also to protect the other parts from being damaged or to prevent the entrance of foreign material into the outlet passage 15. At this time the gas pressure holds the valve 26 against the valve seat 25 and thus effectively prevents leakage. Nothwithstanding the fact that the gas pressure may be very high, the valve 26 will not bend due to the provision of the metal backing member 29. It will be seen that there are no exposed parts which are liable to damage and that any engagement or impact against the plug 60 will do no harm.

When the cylinder is ready for use the plug 60 is removed and the lower end of the stem 41 is extended into the outer end of the outlet passage 15. The nut 52 is then slid downwardly and rotated so that it is screwed into the upper threaded portion 34 of the outlet passage 15. Due to the engagement of the lower end of this nut 52 with the shoulder 43, the stem 41 is forced downward. When the parts reach the position shown in Fig. 1 the shoulder 43 comes into engagement with the upper wall of the gasket 32 and compresses the same. This forms a seal between the valve stem 41 and the body 12 and thus prevents leakage. The pin 44 is of such a length that the shoulder will engage or compress the gasket 32 prior to the time that the valve 26 is engaged and unseated in order that a seal will be formed between the stem and body before any gas is allowed to pass through the outlet passage 15. As the parts are advanced downwardly from the position shown in Fig. 1 the gasket 32 is further compressed, and in addition to this the lower end of the pin 44 engages the valve 26 and forces it downward from its seat 25, thus opening the outlet passage 15 and allowing gas to flow therethrough. Considerable force may be required to unseat the valve 26, but, notwithstanding this fact, there will be no bending of the valve due to the provision of the metal backing plate 29. At this time gas flows through the passage 23 around the pin 44, into the space inside the gasket 32, and then through the port 46 and into the stem passage 45 whereby it may flow into and through the pigtail 50.

When the removable part 40 is disconnected from the permanent part the valve will be allowed to seat before the gasket 15 is released, and in this way the outlet passage will be closed before the seal between the stem and body is relieved.

In Fig. 6 I have illustrated an alternative form of valve in which the metal backing member 57 is provided with a central lug 29a which extends through a central opening in the part 28 so that the pin 44 may engage the metal and not tend to distort the layer of valve material 28.

It is believed that the features and advantages of my invention, as pointed out heretofore, not only in the statement of invention, but also during the course of the detailed description of the preferred form of my invention, will serve to teach those skilled in the art as to how my invention may be put into use and as to its various features and advantages over the prior art.

Various modifications may be made, such, for example, as making the member 19 integral with the body 12, and making the perforate wall 16 removable so that the valve member 26 can be installed through the lower end of the body. Likewise, the nut and stem could be made integral and a joint formed between the pigtail 50 and stem which would allow relative rotation. It should be understood that the form of my invention illustrated herein has certain features and advantages embodied in its details of construction and is a preferred form of my invention. It should be understood, however, that the invention is to be construed broadly in accordance with the statement of invention and appended claims.

I claim as my invention:

1. In a valve: a body having an outlet passage, threads formed therein, and a lower perforate wall means crossing the lower end of said passage; a valve seat member having a downwardly facing valve seat, said valve seat member being screwed into said passage and being removable outwardly therefrom; a valve in said outlet passage between said valve seat member and said perforate wall means, said valve being engageable with said valve seat for closing said outlet passage; a valve opening means adapted to extend into said outlet passage and having a valve engaging portion and a passage adapted to communicate with said outlet passage; externally threaded securing means cooperating between said body and valve opening means and being screwable into the threads in said outlet passage for securing same together and for causing said valve engaging portion to unseat said valve; and gasket means cooperating between said body and valve opening means and operative to form a seal between said body and valve opening means at least as soon as said valve is unseated.

2. In a valve: a body having an outlet passage, threads formed therein, and a lower perforate wall means crossing the lower end of said passage; a valve seat member having a downwardly facing valve seat, said valve seat member being threadedly supported in the inner portion of said passage and being removable outwardly therefrom; a valve in said outlet passage between said valve seat member and said perforate wall means, said valve being engageable with said valve seat for closing said outlet passage; a valve opening means adapted to be screwed into said outlet passage and having a valve engaging portion and a passage adapted to communicate with said outlet passage; and gasket means in said outlet passage immediately outside said valve seat member and being removable outwardly through said outlet passage and engageable by said valve opening means when said valve opening means is screwed into said outlet passage to form a seal between said body and said valve opening means.

3. In a valve: a body having an outlet passage, said outlet passage having an inner threaded portion, an outer threaded portion, an intermediate gasket receiving recess between said threaded portions, and an integral perforate wall means enclosing the inner end of said outlet passage; a valve seat member removably received in said inner threaded portion and being removable outwardly from said outlet passage, said valve seat member having a valve seat and cooperating with said perforate wall means to form a valve chamber in said outlet passage; a valve in said valve chamber and engageable with said valve seat; a gasket in said gasket receiving recess; a non-rotatable stem adapted to be extended into said outlet passage and having a valve engaging portion, an inner shoulder, and a passage adapted to communicate with said outlet passage; and a nut rotatable on said stem and engageable with said shoulder, said nut being threadable into said threaded portion of said outlet passage to cause said stem to be moved inwardly in said outlet passage to cause same to engage said gasket and to unseat said valve.

4. In a valve and connecting means of the character described, the combination of: a valve casing having an opening leading in from the outer part thereof, said opening communicating with the inner face of said casing; a valve body disposed within said opening, said body comprising a valve port with a seat at the inner end thereof, and a closure member movable outwardly into engagement with said seat so as to lie across the inner end of said port; a tubular connector element adapted to be connected to the outer portion of said opening, said connector element having an annular shoulder and a stem which projects through said port and displaces said closure member from said seat when said connector element is connected to said opening; and means in said opening for sealing engagement with said valve body said tubular connector element and said valve casing, said sealing means being of such thickness that it will be compressed between said valve body and said annular shoulder of said tubular connector element.

5. In a valve and connecting means of the character described, the combination of: a valve casing having an opening leading in from the outer part thereof, said opening communicating with the inner face of said casing; a valve body disposed within said opening, said body comprising a valve port with a seat at the inner end thereof, and a closure member movable outwardly into engagement with said seat so as to lie across the inner end of said port; a tubular connector element adapted to be connected to the outer portion of said opening, said connector element having an annular shoulder and a stem which projects through said port and displaces said closure member from said seat when said connector element is connected to said opening; screw means rotatable relatively to said connector element and being operative to move said connector element into said opening; and sealing means in said opening engaging said valve body, said tubular connector element and being of such thickness that it will be compressed between said valve body and said annular shoulder when said connector element is moved into said opening.

6. In a valve and connecting means of the character described, the combination of: a valve casing having an opening leading in from the outer part thereof, said opening communicating with the inner face of said casing, and the outer portion of said opening being threaded; a valve body disposed within said opening, said body comprising a valve port with a seat at the inner end thereof, and a closure member movable outwardly into engagement with said seat so as to lie across the inner end of said port; a tubular connector element adapted to pass into the outer portion of said opening, said connector element having a shoulder near the end thereof and having a stem which projects through said port and displaces said closure member from said seat when said connector element is connected to said opening; a sleeve surrounding said connector element above said shoulder, said sleeve having external threads whereby it may be screwed into the outer portion of said opening, whereby to secure said connector elements in communication with said opening; and sealing means in said opening to engage said connector element and prevent leakage therearound at least while said closure member is displaced from said seat by said stem.

EARL M. EVLETH.